United States Patent
Listou

(10) Patent No.: US 8,794,766 B2
(45) Date of Patent: Aug. 5, 2014

(54) SYSTEM AND METHOD FOR PHYSICALLY DISABLED PERSONS TO READ E-PUBLICATIONS

(71) Applicant: Robert Listou Trust, Falls Church, VA (US)

(72) Inventor: Robert E. Listou, Falls Church, VA (US)

( * ) Notice: Subject to any disclaimer, the term of this patent is extended or adjusted under 35 U.S.C. 154(b) by 0 days.

(21) Appl. No.: 14/070,517

(22) Filed: Nov. 2, 2013

(65) Prior Publication Data

US 2014/0152787 A1    Jun. 5, 2014

Related U.S. Application Data

(63) Continuation-in-part of application No. 13/777,517, filed on Feb. 26, 2013.

(60) Provisional application No. 61/732,169, filed on Nov. 30, 2012.

(51) Int. Cl.
| | | |
|---|---|---|
| *G03B 21/14* | (2006.01) | |
| *F16M 11/04* | (2006.01) | |
| *F21S 8/00* | (2006.01) | |
| *H04N 9/31* | (2006.01) | |
| *H04N 5/44* | (2011.01) | |
| *F16M 11/06* | (2006.01) | |
| *F21V 21/28* | (2006.01) | |
| *F21S 6/00* | (2006.01) | |
| *H04N 1/00* | (2006.01) | |

(52) U.S. Cl.
CPC ............ *G03B 21/142* (2013.01); *H04N 9/3173* (2013.01); *H04N 5/44* (2013.01); *F16M 11/06* (2013.01); *F21V 21/28* (2013.01); *F21S 6/003* (2013.01); *H04N 1/00403* (2013.01); *G03B 21/145* (2013.01)

USPC .......... 353/39; 353/119; 248/176.3; 362/427; 348/211.2; 340/13.24; 455/151.2; 386/231

(58) Field of Classification Search
CPC .... G03B 21/14; G03B 21/142; G03B 21/145; F16M 11/06; F16M 11/00; H04N 9/3173; H04N 1/00403; H04N 2005/4432; F21M 11/121; F21V 21/28; F21S 6/003; H04W 88/12
USPC ................. 353/39, 119, 122; 248/276.1, 419, 248/176.3; 362/413, 419, 427; 348/211.2, 348/14.02; 340/13.24; 455/3.06, 151.2; 386/231

See application file for complete search history.

(56) References Cited

U.S. PATENT DOCUMENTS

| | | |
|---|---|---|
| 7,623,135 B1 | 11/2009 | Diamond et al. |
| 8,152,308 B2 | 4/2012 | Ahn et al. |

(Continued)

*Primary Examiner* — Georgia Y Epps
*Assistant Examiner* — Magda Cruz
(74) *Attorney, Agent, or Firm* — Ascenda Law Group, PC

(57) ABSTRACT

A system for assisting individuals (e.g., those having physical or other disabilities) to read or otherwise experience electronic publications includes a projector having an optical projection assembly located at an end of an articulating arm assembly and configured to project images of an electronic publication and a controller that is sized and contoured to fit comfortably within or be held by a human hand. The controller may include a processor and a storage device communicatively coupled to the processor, which storage device stores processor-executable instructions for providing, via a wireless communication channel and responsive to one or more user inputs, one or more instructions in connection with projection of the images of the electronic publication via the projector.

13 Claims, 4 Drawing Sheets

(56) References Cited

U.S. PATENT DOCUMENTS

| | | |
|---|---|---|
| 8,382,295 B1 * | 2/2013 | Kim et al. .................... 353/119 |
| 8,427,511 B2 | 4/2013 | Shin et al. |
| 2008/0137040 A1 * | 6/2008 | Rodriguez et al. ............. 353/79 |
| 2008/0153332 A1 * | 6/2008 | Lee et al. ..................... 439/162 |
| 2008/0162356 A1 | 7/2008 | Parker et al. |
| 2009/0015598 A1 | 1/2009 | Broussard |
| 2012/0162870 A1 * | 6/2012 | MacDonald et al. .... 361/679.01 |
| 2012/0176415 A1 | 7/2012 | Cho |
| 2012/0299882 A1 | 11/2012 | Warvel |

* cited by examiner

SYSTEM AND METHOD FOR PHYSICALLY DISABLED PERSONS TO READ E-PUBLICATIONS

RELATED APPLICATIONS

This application is a CONTINUATION-IN-PART of U.S. application Ser. No. 13/777,517, filed, Feb. 21, 2013, currently pending, which is a NONPROVISIONAL of and claims priority to U.S. Provisional Application No. 61/732,169, filed Nov. 30, 2012, which is incorporated herein by reference.

FIELD OF THE INVENTION

The present invention relates to systems and methods for physically disabled persons to read or otherwise experience electronic publications, such as e-books and the like.

BACKGROUND

The generally accepted benefit of mental stimulation by reading is denied to millions of persons who lack the means, physical strength, and/or dexterity to hold and navigate a book, magazine, newspaper, or e-reading device (tablet computer, small dedicated e-book reader, smart phone, etc.) either permanently or for extended periods of time. Such persons are among the many ill, wounded and disabled members of the military and veterans, residents of continuing care retirement communities (CCRC) who are permanently or temporarily receiving nursing care, persons in nursing homes, hospital patients, and disabled persons residing in private homes. Some are confined to beds, while others are able to sit erect in wheelchairs or electric scooters. All usually have assistance available to fulfill immediate needs, but lack continuous care such as having a book read aloud, or turning a page when the reader wishes.

SUMMARY OF THE INVENTION

In one embodiment, the present invention provides a system for assisting individuals (e.g., those having physical or other disabilities) to read or otherwise experience electronic publications. The system includes a projector having an optical projection assembly located at an end of an articulating arm assembly and configured to project images of an electronic publication via a lens system; and a controller that is sized and contoured to fit comfortably within or be held by a human hand. The controller may include a processor and a storage device communicatively coupled to the processor, which storage device stores processor-executable instructions for providing, via a wireless communication channel and responsive to one or more user inputs, one or more instructions in connection with projection of the images of the electronic publication via the projector.

The controller may include various user selectable elements, such as those to control a projected size of text of the electronic publication, to control proceeding forwards or backwards through projected pages of the electronic publication, to control the power state of the controller and/or the projector, etc. The controller may also include a port for receiving voice commands from a user and/or for providing an audio output. Additional ports (e.g., a USB port) may be provided for receiving a file comprising the electronic publication to be projected via the projector.

In a further embodiment of the invention, images of an electronic publication are projected, via a lens system of a projector, and may be altered according to instructions received, via a wireless communication channel, at the projector from a controller, such as the controller described above. This alteration may be any of presentation of a succeeding or previous page of the electronic publication from that which is currently being presented, or changing a projected font size of text of the electronic publication. An audio track associated with the electronic publication, if one exists, may be played concurrently with or in lieu of the projection of the electronic publication, for example via a speaker on the controller or a headset communicatively coupled thereto.

BRIEF DESCRIPTION OF THE DRAWINGS

The present invention is illustrated by way of example, and not limitation, in the figures of the accompanying drawings, in which.

DESCRIPTION

In various embodiments, the present invention allows users such as those discussed above (and others) to experience the joy and benefits of reading by providing systems and methods for such persons to read or experience e-publications. A system configured in accordance with one embodiment of the present invention includes a remote control unit and a projection device communicatively coupled thereto. Together, these units facilitate the presentation of electronic content (e.g., e-books and similar publications) by and for users who find it difficult or uncomfortable to use conventional e-reading devices.

Figure 1:
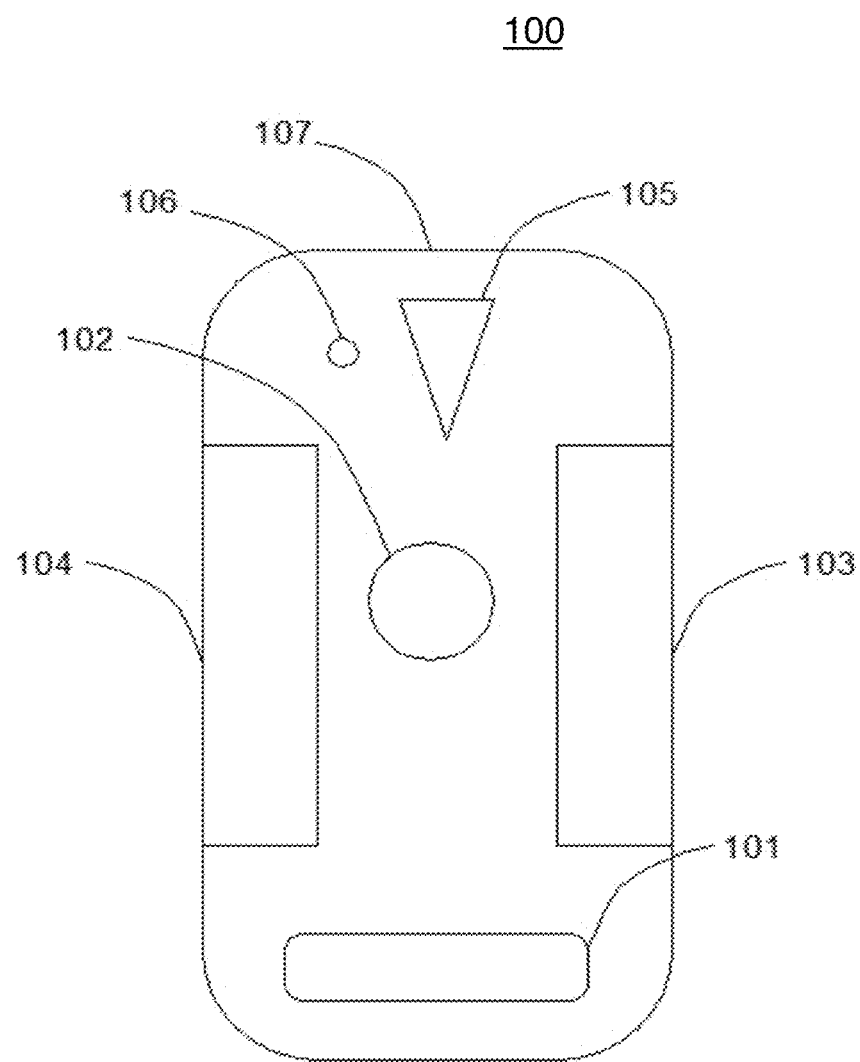
FIG. 1 illustrates an example of a controller configured in accordance with an embodiment of the present invention.

The remote control unit ("controller") may be instantiated as a physically small device, ergonomically contoured to fit comfortably within or be held by a human hand, and includes components similar to those of conventional e-reader devices other than a large display for viewing electronic content. FIG. 1 illustrates an example of such a controller 100, which includes a power on/off button 101, a menu button 102, buttons for selecting a next page 103 or a previous page 104, a rocker switch 105 for adjusting the size of the projected text (e.g., by tilting the rocker toward the wide end for larger text and toward the narrow end for smaller text), a microphone/headset port 106, and port 107 (not shown in detail in this view) for connection to an external power source (e.g., for charging an internal battery). Of course, this illustration is not intended to be limiting in nature and other controller instantiations are certainly possible. In any such instantiation, however, it may be preferable to use relatively few, large, widely dispersed and easily operated buttons (or other actuators) so that persons with physical disabilities (and possibly diminished mental capacity) can operate the controller easily and with minimal training.

Power on/off button 101 may control the operating state of either or both of the controller and the projector, which is discussed in greater detail below. For example, pressing the power button 101 once may turn on just the controller, while pressing power button 101 twice within a certain time period may activate both the controller and the projector. Alternatively, in some embodiments both devices may be powered on in response to a single click of the power on/off button. Likewise, a single click may be used to power off both the controller and the projector. In some instances, power on/off button may be two buttons; one for powering on these components, and the other for powering off these components. In still other cases, the power on/off button may be a slide control or other actuator and may have separate operating positions for powering on just the controller, just the projector or both components.

The microphone/headset port 106 is optional and may be provided if voice control of the controller functions is desired. In some instances the microphone may be remote from the controller (e.g., worn as a clip-on microphone or other wireless microphone by the user). For example, the microphone may be integrated in controller 100 or may be included in a headset or other similar apparatus worn by a user and voice commands may be relayed to the controller by wired or wireless communications means (e.g., a Bluetooth or other wireless communication link). The remote microphone may be in lieu of or in addition to the integrated microphone. When a headset is attached to the controller (either through wired or wireless communication means), audio may be played out through earphones or speakers associated with the headset. This may allow for playback of audio books or audio tracks accompanying electronic content displayed via the projector in a fashion that does not disturb others in the vicinity of the user.

In addition, optional means for temporarily affixing the controller to a wheelchair, bed, armchair, electric scooter, or other piece of furniture or ambulatory assistance device may also be provided. This may include, for example, fabric hook and loop fasteners (e.g., Velcro™ brand fasteners), weighted bases, semi-adhesive fasteners, and so on.

A speaker (not shown) may also be provided in the controller, for example, for producing audible tones used for alerts or to provide voice instructions, etc. Likewise, one or more of a Universal Serial Bus (USB), High Definition Multi Media (HDMI), SD Card, or other port may be provided to accept USB or HDMI fobs, SD Cards, or the like, which include electronic content for projection by way of the projector. In other instances, one or more of these ports may be provided on the projector.

Figure 2:
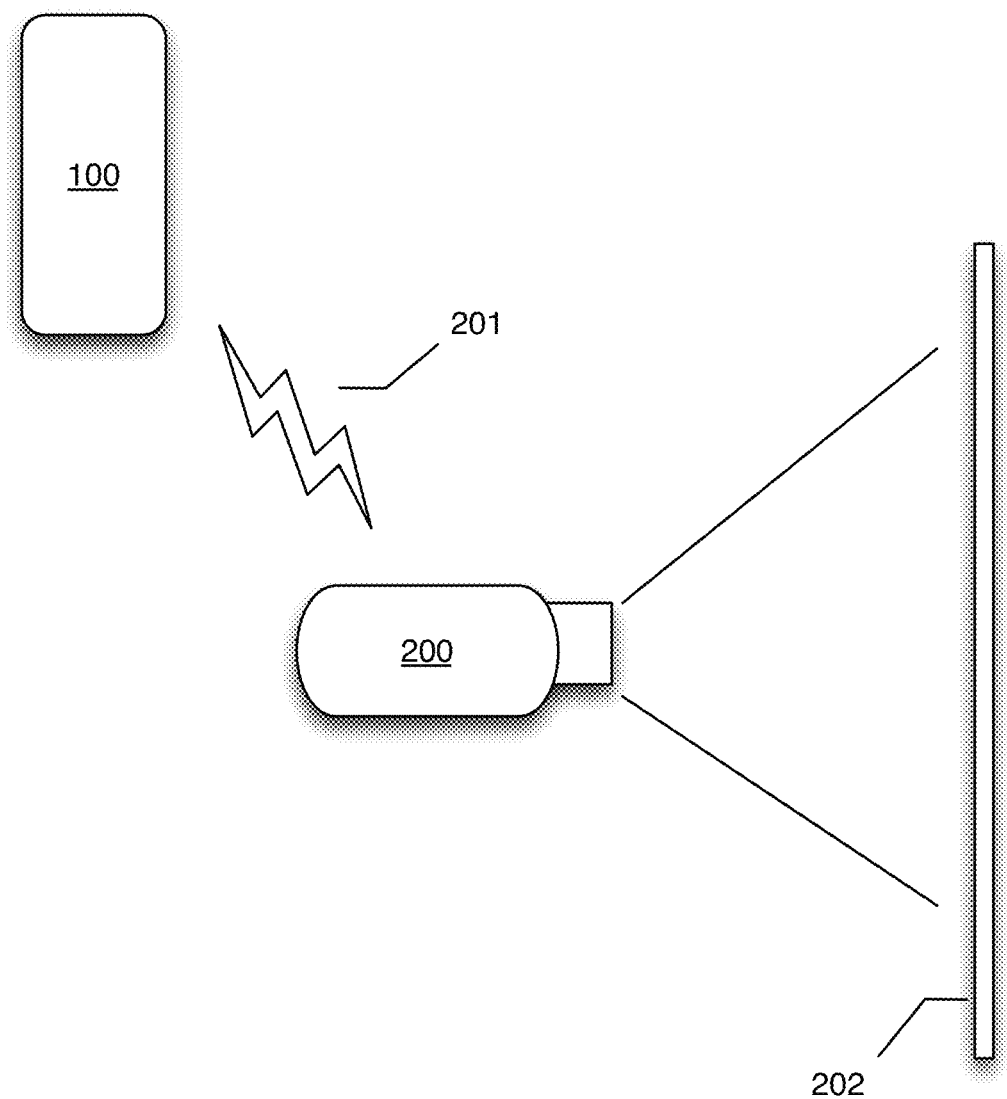
FIG. 2 illustrates an example of a system configured in accordance with an embodiment of the invention that includes a controller and a projector in wireless communication with one another.

The second component of a system configured in accordance with the present invention is a projector 200, as shown in FIG. 2. The projector 200 is communicatively coupled to the controller via a wired or, preferably, wireless communication link 201. In some instances this may be a radio frequency or infrared communication link over which commands related to the projection of the electronic content from the controller to the projector are relayed. For example, communication links compliant with one or more conventional communication protocol standards such as Bluetooth™, WiFi (IEEE 802.11 a/b/g/n), WiLan (IEEE 802.16), IrDA, etc. may be used and the controller 100 and projector 200 may be configured with appropriate hardware and firmware to support such communications. Images projected by projector 200 are presented via a lens system of the projector and displayed on a screen 202 positioned some distance away from the projector.

The images are, of course, those of a selected e-publication, which the user of the system wishes to read. Publications may be downloaded or otherwise obtained in electronic form from a variety of sources, including Internet-based bookstores, newspapers, magazines, etc. The content may also be obtained on physical media, such as a CD-ROM, SD Card, USB fob, or other media. In the case of e-publications distributed on physical media, either the projector or the controller may be configured to read the media and cause the contents thereof to be rendered by the projector. For example, the projector may be configured with an optical media drive for reading (responsive to commands issued by the controller 100) CD-ROMs or other similar media and displaying the media content thereof on display 202. In the case of media content distributed on SD Cards, the controller may be configured with an interface for accepting same (similar to a digital camera having an interface for such cards) and media content read from the SD Card may be transferred over the communication link 201 to the projector 200 for display. In cases where the electronic content for presentation via projector 200 is stored on the controller or on a media device coupled to the controller, the content as well as commands concerning its presentation will be provided (via a wired or wireless communication link) from the controller to the projector.

In many instances, however, media content may be directly downloaded to a storage device resident either in the projector or the controller. For example, either the projector or the controller (or both) may have flash memory or other media for storing media content downloaded from a source (and/or from physical media). The media content may then be read from the flash memory or other storage resident in the device and projected.

As many functions, such as downloading or otherwise setting up content for display, are expected to be handled by an attendant, perhaps with the assistance of a conventional computer system (not shown), the functionality of the controller 100 (and, optionally, the projector 200) may be kept relatively simple. For example, the controller need only include basic operating controls to permit turning pages and adjusting the text size being displayed. Text size adjustment may correspond to the projector lens assembly zooming in or out. The projector is configured to display (responsive to commands from the controller) the menu and/or selected pages from the e-publication either on a wall or screen 202 for a person in a sitting position, or on the ceiling for a person lying in bed. In some instances, this may require the ability to rotate displayed images by up to 180 degrees from their customary projection view, for example to accommodate persons lying on their side, etc. Image rotation may be facilitated by providing menu options for rotations of fixed angles (e.g., 90 degrees, 180 degrees, etc.) and/or continual adjustments (e.g., through any angle up to 180 degrees clockwise and/or counter-clockwise).

Figure 3:
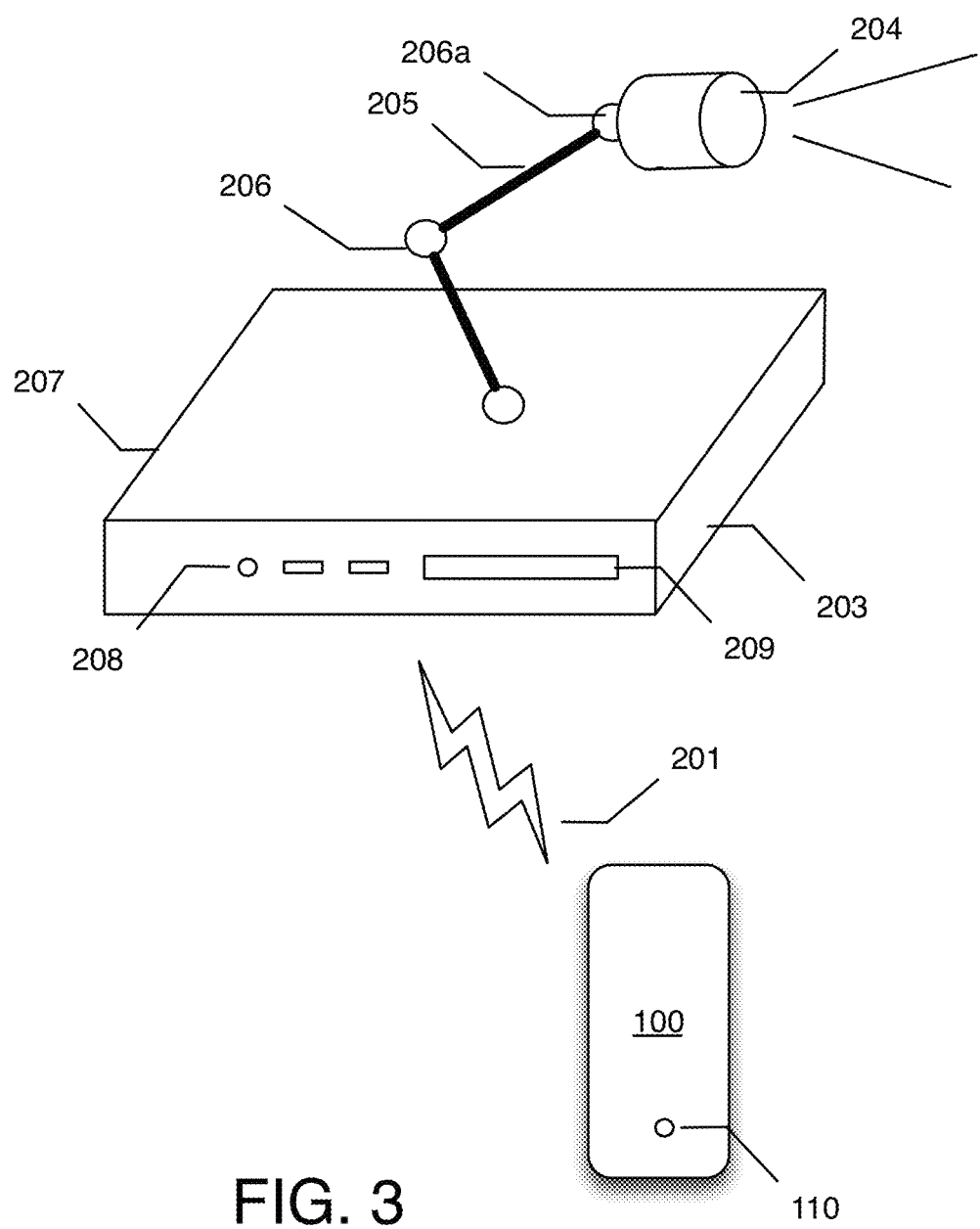
FIG. 3 illustrates an example of a projection unit having a lens assembly mounted on an articulable arm in accordance with an embodiment of the invention.

FIG. 3 illustrates one example of a projector 203. In this example, the projector has a lamp and lens assembly or other optical projection assembly 204 located at the end of an articulating arm assembly 205. The articulating arm assembly 205 may include a number of articulable joints 206 that allow the optical projection assembly to be positioned as desired and displaced from a base unit 207. One of the articulable joints 206*a* may also facilitate rotation of the optical projection assembly about an axis so as to facilitate rotation of a projected image.

In some instances the optical projection assembly 204 may include only a lens assembly, with a lamp, laser diode or other illumination source being included in the base unit 207. In such circumstances, one or more optical fibers or other light conveying means may be included in the articulating arm assembly 205 to convey the light to the optical projection assembly. As shown in the illustration, base unit 207 may be coupled to the articulating arm assembly via one of the articulating joints.

The base unit 207 may include one or more input/output ports 208. As alluded to above, these ports may include one or more of a USB port, HDMI port, SD Card port, or other port. Alternatively, or in addition, a CD/DVD player with input/output slot 209 may be included in the base unit 207.

It is envisioned that when the system is utilized by a disabled person an aide would set up projector 203 in a convenient area for projecting images and provide the viewer with the controller 100 (and instructions for its use, as appropriate), which the viewer may then use. The controller may be configured with an attendant assistance button or other user interface element 110, for use by the viewer when help for the attendant is required. When depressed or otherwise activated, the attendant assistance button causes the controller to issue an alert to be generated for the attendant as an indication that the viewer requires assistance. The alert may be in the form of a signal (e.g., transmitted via a WiFi, Bluetooth or other wireless communications network) to a receiver at a remote monitoring station where the attendant is located and may identify the controller by a unique name, serial number or other identifier so that the attendant can recognize the controller/viewer from which the request for assistance originated. In some cases the alert may be provided as a text message (e.g., via a messaging channel of a cellular or similar communications network) to a mobile phone carried by the attendant. The attendant assistance button also serves as an emergency notification means in the event the viewer suffers medical crisis that requires immediate attention.

Using projector 203, digital content from a selected source may be projected through optical projection assembly 204 towards a screen, wall, ceiling or other surface for viewing by a user. Because the optical projection assembly is located at the end of an articulating arm assembly, the projected image may be oriented in a location convenient for the user's viewing. In some cases, the optical projection assembly may include a zoom capability to allow for magnification of the images so projected.

Figure 4:
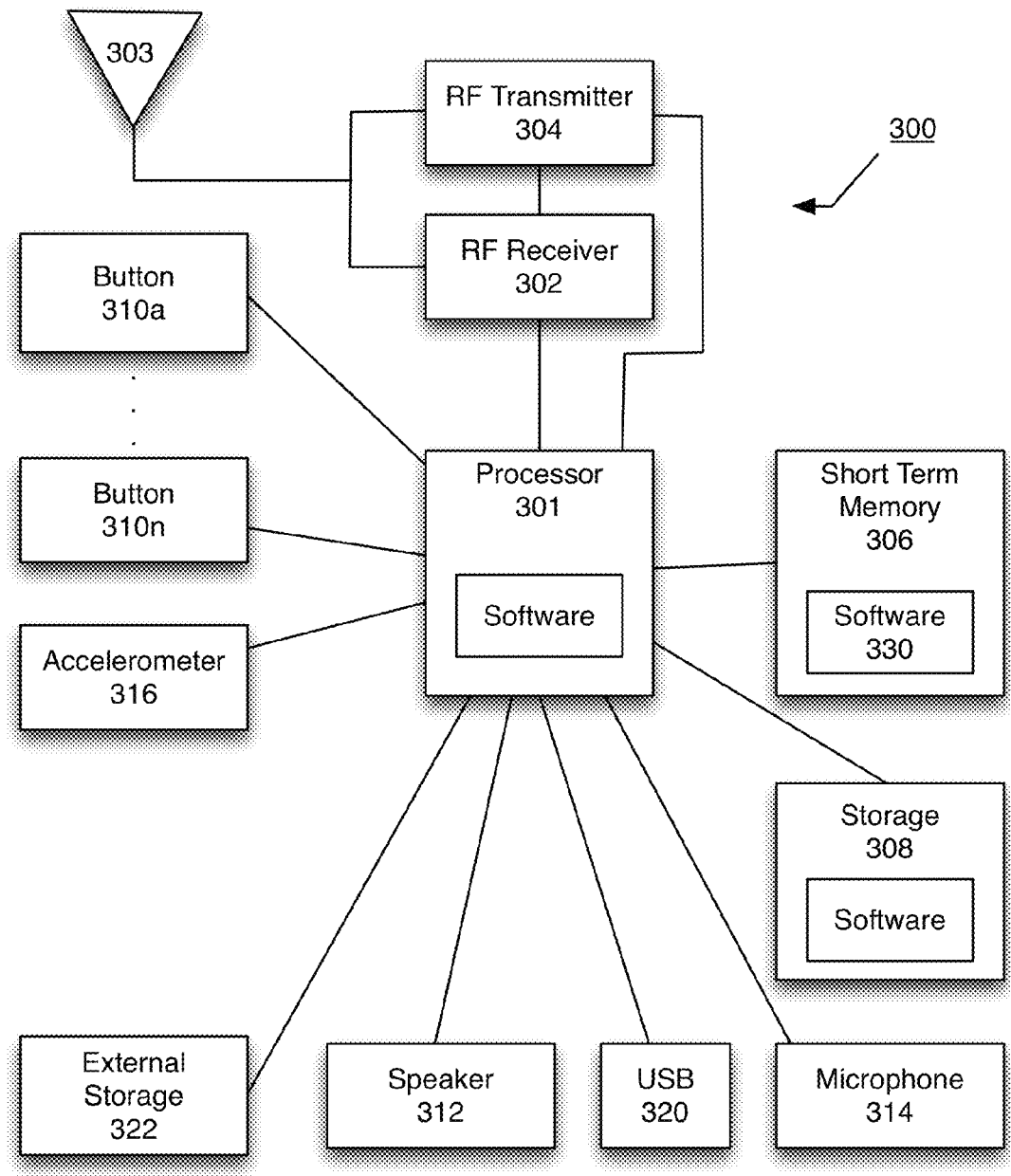
FIG. 4 illustrates an example of the hardware architecture of a controller configured in accordance with an embodiment of the present invention.

As should be evident, the methods described herein may be executable on various computer-based devices. Such devices may include any electronic device capable of performing the actions described above (using suitable programming) and, where applicable, processing the information for display so as to properly convey the information. FIG. 4 shows one example of such a controller in the form of an electronic device 300.

Processor 301 may control the overall functions of the electronic device such as running applications and controlling peripherals. Processor 301 may be any type of processor and may communicate with RF receiver 302 and RF transmitter 304 to transmit and receive wireless signals (e.g., via antenna 303) such as Bluetooth, Wi-Fi, WiLAN, or other communication signals. In some instances, a separate wireless communications module may be provided for communication with a remote microphone, as discussed above. Processor 301 may use short-term memory 306 to store operating instructions (e.g., software 330) and to help in the execution of the operating instructions (e.g., such as the temporary storage of calculations and the like). Processor 301 may also use non-transitory storage 308 to store and read instructions, files, and other data that requires long term, non-volatile storage. Generally, the controller will execute an electronic reader application as an environment within which the files that comprise an electronic publication are prepared for presentation via the projector.

Processor 301 may receive input from one or more physical buttons 310*a*-310*n*. Processor 301 may produce audio output and other alerts that are played via a speaker 312. Microphone 314 may be used as an input device for processor 301 to receive commands using voice-processing software.

Accelerometer 316 provides input on the motion of the device 300 to processor 301. Accelerometer 316 may be used in motion sensitive applications, or, for example, in connection with scrolling content or turning pages using tilting gestures, etc. USB port 320 enables external connections to other devices supporting the USB standard and charging capabilities. USB port 320 may include all the functionality to connect to, and establish a connection with, an external device over USB. External storage module 322 may include any form of removable physical storage media such as a flash drive, micro SD Card, SD Card, Memory Stick, and the like. External storage module 322 may include all the functionality needed to interface with these media.

Thus, systems and methods for assisting physically disabled persons to read or otherwise experience electronic publications, such as e-books and the like, have been described.

What is claimed is:

1. A system for assisting individuals to read or otherwise experience electronic publications, said system comprising:
   a projector having an optical projection assembly located at an end of an articulating arm assembly and configured to project images of an electronic publication via a lens system; and
   a controller comprising a processor and a storage device communicatively coupled to the processor, said storage device storing processor-executable instructions, which when executed by the processor cause the processor to provide, via a wireless communication channel and responsive to one or more user inputs, one or more instructions in connection with projection of the images of an electronic publication, wherein said controller is sized and contoured to fit comfortably within or be held by a human hand.

2. The system of claim 1, wherein said controller comprises a user selectable element to control a projected size of text of the electronic publication.

3. The system of claim 1, wherein said controller comprises one or more user selectable elements to control proceeding forwards or backwards through projected pages of the electronic publication.

4. The system of claim 1, wherein said controller comprises a port for receiving voice commands from a user.

5. The system of claim 1, wherein said controller comprises a port for providing an audio output.

6. The system of claim 1, wherein said controller comprises one or more ports for receiving a file comprising the electronic publication to be projected via the projector.

7. The system of claim 6, wherein at least one of said one or more ports for receiving the file comprising the electronic publication comprises a Universal Serial Bus port.

8. The system of claim 1, wherein said controller comprises at least one user operable control for determining a power state of said controller.

9. The system of claim 8, wherein said at least one user operable control for determining a power state of said controller also controls a power state of said projector.

10. The system of claim 1, wherein the controller is configured to transmit an alert message to an attendant in response to user manipulation of a user interface element of the controller.

11. The system of claim 10, wherein the signal is encoded so as to include identifying information of the controller.

12. The system of claim 1, wherein the controller is configured to download and store electronic publications.

13. The system of claim 1, wherein the controller does not include a display for viewing the electronic publication.

* * * * *

UNITED STATES PATENT AND TRADEMARK OFFICE
CERTIFICATE OF CORRECTION

| | | Page 1 of 1 |
|---|---|---|
| PATENT NO. | : 8,794,766 B2 | |
| APPLICATION NO. | : 14/070517 | |
| DATED | : August 5, 2014 | |
| INVENTOR(S) | : Robert E. Listou | |

It is certified that error appears in the above-identified patent and that said Letters Patent is hereby corrected as shown below:

On the Title Page, Item (63) Related U.S. Application Data and in the Specification, At column 1, line 8:

"13/777,517" should read --13/773,517--

Signed and Sealed this
Twenty-eighth Day of October, 2014

Michelle K. Lee
*Deputy Director of the United States Patent and Trademark Office*